(12) United States Patent
Dederer

(10) Patent No.: US 7,792,481 B2
(45) Date of Patent: Sep. 7, 2010

(54) METHOD FOR INTERFACE ADAPTATION OF A HARDWARE BASEBAND RECEIVER IN SATELLITE COMMUNICATION SYSTEMS, INTERFACE ADAPTER FOR HARDWARE BASEBAND RECEIVER, A CORRESPONDING COMPUTER PROGRAM, AND A CORRESPONDING COMPUTER-READABLE STORAGE MEDIUM

(75) Inventor: Rudolf Dederer, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 1160 days.

(21) Appl. No.: 11/429,585

(22) Filed: May 5, 2006

(65) Prior Publication Data

US 2006/0282579 A1 Dec. 14, 2006

(30) Foreign Application Priority Data

May 19, 2005 (DE) ...................... 10 2005 023 174

(51) Int. Cl.
*H04H 20/74* (2008.01)
(52) U.S. Cl. ...................... 455/3.02; 375/137; 375/150; 342/357.12
(58) Field of Classification Search ................. 455/220, 455/313, 326, 3.02; 375/137, 142, 150, 343; 342/357.12
See application file for complete search history.

(56) References Cited

U.S. PATENT DOCUMENTS

| | | | | |
|---|---|---|---|---|
| 6,084,928 A | * | 7/2000 | Kuwahara | 375/347 |
| 6,639,537 B1 | * | 10/2003 | Raz | 341/155 |
| 6,646,595 B1 | * | 11/2003 | Heng et al. | 342/357.06 |
| 6,891,880 B2 | * | 5/2005 | Abraham | 375/142 |
| 7,305,021 B2 | * | 12/2007 | Ledvina et al. | 375/137 |
| 7,313,421 B2 | * | 12/2007 | Dejanovic et al. | 455/574 |
| 2005/0140545 A1 | | 6/2005 | Subbarao et al. | |

* cited by examiner

*Primary Examiner*—Raymond S Dean
(74) *Attorney, Agent, or Firm*—Kenyon & Kenyon LLP

(57) ABSTRACT

In order to provide a method for interface adaptation of a hardware baseband receiver in satellite communication systems, an interface adapter, as well as a corresponding computer program and a corresponding computer-readable storage medium that provide a flexible interface for a hardware baseband receiver to a RF front end, where the flexible interface allows different RF front ends to be operated on such a hardware baseband receiver, an interface adapter (100) is inserted between a RF front end (102) and the correlators (101) of the hardware baseband receiver (104); the interface adapter (100) adjusting the sampling rate, intermediate frequency, quantization, and/or signal representation of a baseband-receiver interface of the RF front end (102) to specifiable values.

18 Claims, 2 Drawing Sheets

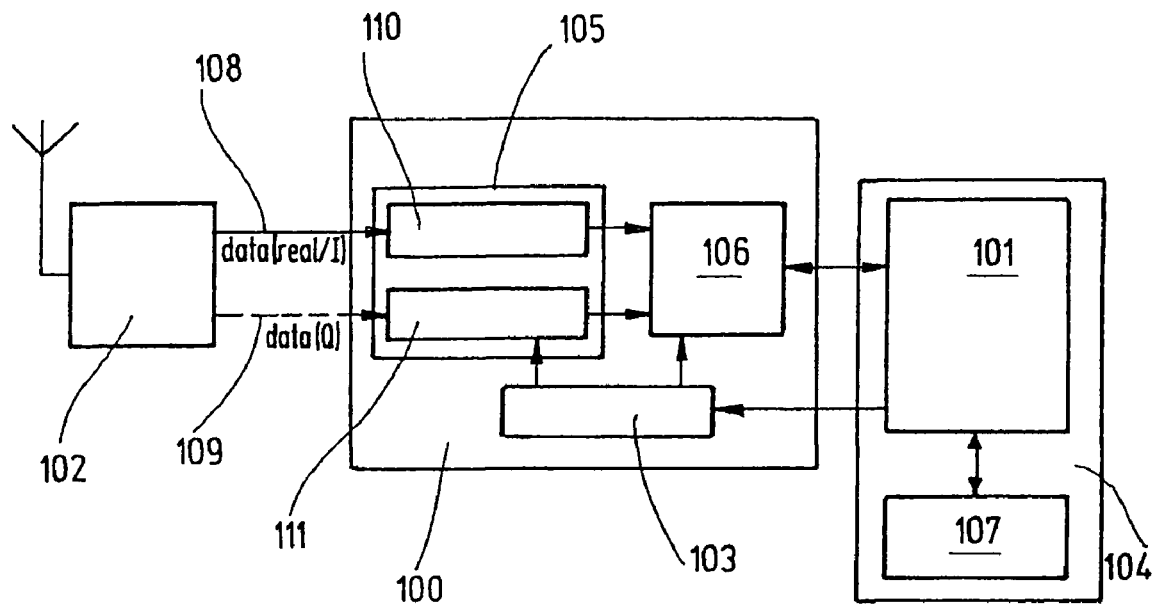
Fig.1
|   | ONE COMPL | TWO COMPL |
|---|---|---|
| I | 0 | 0 |
| II | 1 | 0 |
| III | 0 | 1 |
Fig.2
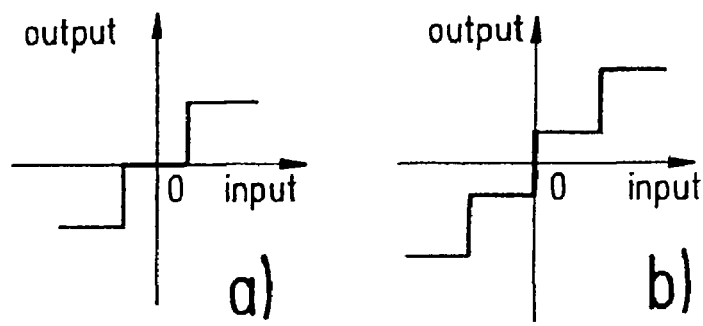
Fig.3

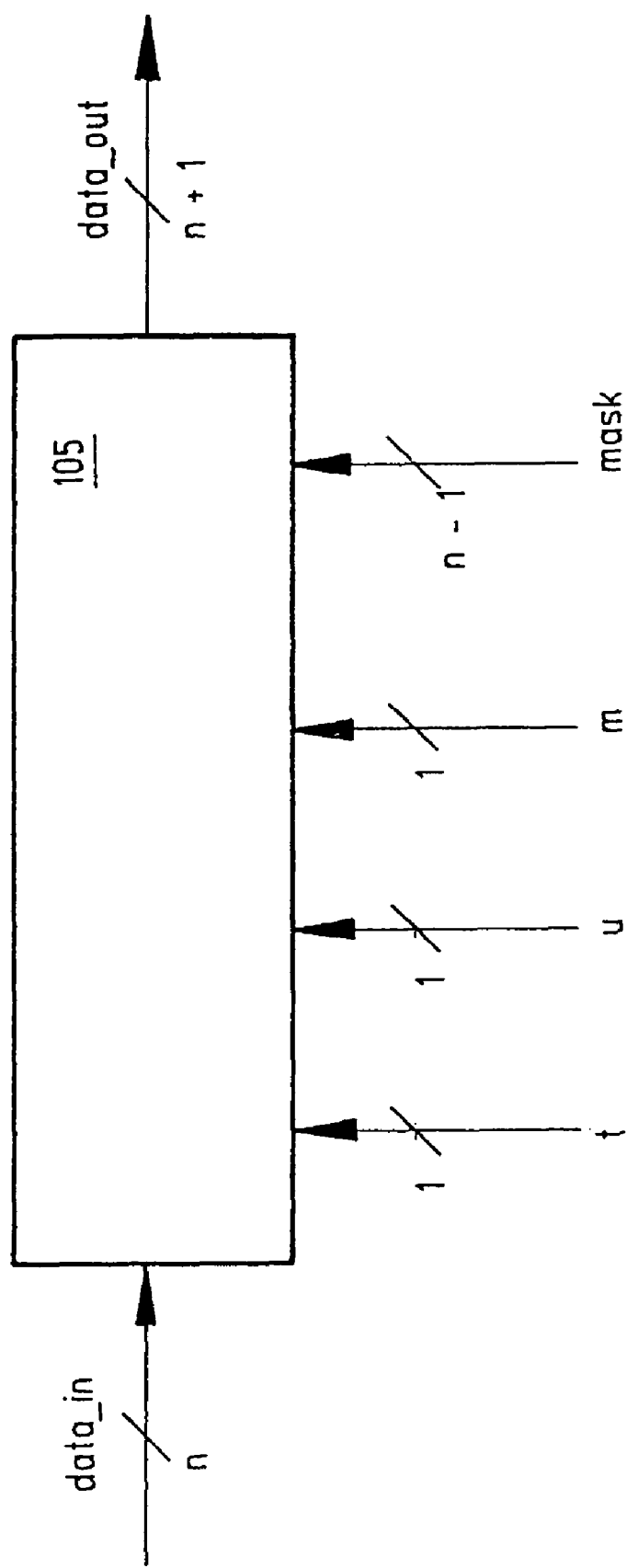

METHOD FOR INTERFACE ADAPTATION OF A HARDWARE BASEBAND RECEIVER IN SATELLITE COMMUNICATION SYSTEMS, INTERFACE ADAPTER FOR HARDWARE BASEBAND RECEIVER, A CORRESPONDING COMPUTER PROGRAM, AND A CORRESPONDING COMPUTER-READABLE STORAGE MEDIUM

FIELD OF THE INVENTION

The present invention relates to a method for interface adaptation of a hardware baseband receiver in satellite communication systems, an interface adapter for hardware baseband receivers, as well as a corresponding computer program and a corresponding, computer-readable storage medium, which may be used, in particular, for providing a flexible interface for a hardware baseband receiver to a RF front end (RF=radio frequency, high frequency), using a digital, intermediate frequency onto which the front end mixes the RF-signal of the antenna, and, therefore, for operating different RF front ends on such a baseband receiver.

DESCRIPTION OF RELATED ART

A GNSS receiver (GNSS=Global Navigation Satellite System, such as GPS [=Global Positioning System], Galileo, or the like) according to the related art is made up of a RF front end, by which the antenna signal is mixed onto an intermediate frequency, an analog-to-digital converter, and a baseband processor, which takes on the search for, the correlation of, and the tracking of the GNSS signal.

Most of the modern GNSS front ends have a digital interface including certain, possible sampling rates, intermediate frequencies, quantizations, and signal representations. The hardware baseband design approaches conventionally utilized are specially engineered for particular interfaces to the RF front end. In this context, the baseband processing may be implemented in the form of software (software defined radio) or hardware. Since software implementation requires a large amount of computing power, software implementation is presently only utilized in special cases. As a rule, hardware solutions are used which, however, have the disadvantage that they are fixed to a particular interface of a RF front end.

SUMMARY OF THE INVENTION

It is an object of the invention to provide a method for interface adaptation of a hardware baseband receiver in satellite communication systems, an interface adapter for hardware baseband receivers, a corresponding computer program, and a corresponding, computer-readable storage medium, which eliminate the described disadvantages and provide, in particular, a flexible interface for a hardware baseband receiver to a RF front end, the flexible interface allowing various RF front ends to be operated on such a hardware baseband receiver.

These and other objects of the invention are achieved by a method for interface adaptation of a hardware baseband receiver in satellite communications systems, wherein an interface adapter (100) is inserted between a RF front end (102) and the correlators (101) of the hardware baseband receiver (104), the interface adapter (100) adjusting the sampling rate, intermediate frequency, quantization, and/or signal representation of a baseband-receiver interface of the RF front end (102) to specifiable values.

BRIEF DESCRIPTION OF THE DRAWINGS

The invention will be described in greater detail with reference to the following drawings wherein:

FIG. 1 shows a block diagram of an interface adapter for hardware baseband receivers.

FIG. 2 shows an illustration of the options for representing data words.

FIG. 3 shows position of the quantization thresholds at the 0-level, a) MID_ZERO=1, b) MID_ZERO=0.

FIG. 4 shows a representation of the inputs and outputs of the normalization block.

DETAILED DESCRIPTION OF THE INVENTION

The method of the invention possesses the advantage over the related art that a GNSS baseband receiver may be operated on RF front ends having a digital interface that possesses different sampling rates, intermediate frequencies, quantizations, and signal representations. This is achieved by inserting an interface adapter between a RF front end and the correlators of the hardware baseband receiver, the interface adapter adjusting the
  sampling rate,
  intermediate frequency,
  quantization, and/or
  signal representation
of a baseband-receiver interface of the RF front end to specifiable values.

An interface adapter for hardware baseband receivers in satellite communication systems according to the present invention is characterized in that the interface adapter has at least an interface to a RF front end, an interface to the hardware baseband receiver, and means for adjusting the
  sampling rate,
  intermediate frequency,
  quantization, and/or
  signal representation
of a baseband-receiver interface of the RF front end to specifiable values. It has been proven to be particularly advantageous, when the interface adapter for hardware baseband receivers is integrated into a microchip.

In one advantageous specific embodiment of the present invention, it is provided that the interface adapter for hardware baseband receivers have at least a normalization unit and a configurable frequency mixer, preferably a baseband mixer. The output signals of the RF front end are converted into a uniform representation by the normalization unit, and the normalized output signals are mixed onto a standard frequency, preferably into the baseband, by the configurable mixer. In one preferred embodiment, the normalized output signals are mixed into the base band in complex form.

In another preferred embodiment of the present invention, the normalization unit includes
  a module for normalizing real signals or normalizing the I-branch of complex signals, and
  a module for normalizing the Q-branch of complex signals.
The normalization converts the front-end signal to a representation suitable for the base band. For example, normalizations may be carried out by
  converting an output signal of the RF front end to a "sign+amplitude" representation and
  generating the one complement or
  the two complement of the output signal.

It is possible to implement the normalization in hardware in a particularly simple matter, when the RF front end supplies linearly quantized output data.

A further preferred embodiment of the present invention provides that at least the following registers be made available for adapting the interface:

SAMPLE_RATE: sampling rate of the front-end data
IF_FREQ: intermediate frequency of RF front end 102
NEG_IF: set for reflected IF signals
IF_MASK: configuration of the word length of the front-end data
COMPLEX_IF: set when the front-end signal is present in complex form in the I/Q representation, 0 in the case of real signals
ONE_COML: set in the case of signals in the one-complement representation
TWO_COML: set in the case of signals in the two-complement representation
MID_ZERO: set when, in the analog-to-digital converter, 0 represents a value instead of a threshold.

For example, an interrupt generation is controlled by the SAMPLE_RATE register, and in the case of an interrupt, the storage device for correlation data is read out and the position calculation is started. In this context, it proves to be advantageous when the storage device with for correlation data takes the form of an alternating on buffer; and when, at each interrupt, the memory side which is read out by the processor and the memory side on which correlators operate alternate.

A computer program of the present invention for interface adaptation allows a data-processing device to execute a method for interface adaptation of a hardware baseband receiver in satellite communication systems, after the computer program has been loaded into the memory of the data-processing device; an interface adapter being inserted between a RF front end and the correlators of the hardware baseband receiver, and the interface adapter adjusting the
  sampling rate,
  intermediate frequency,
  quantization, and/or
  signal representation
of a baseband-receiver interface of the RF front end to specifiable values.

Such computer programs may be provided in a data network or communication network in a downloadable manner (for a fee or free, freely accessible or password-protected). The computer programs provided in this manner may then be rendered usable by a method, in which a computer program according to claim 14 is downloaded from an electronic data network, such as the Internet, to a data-processing device connected to the data network.

In order to adapt an RF front-end interface in accordance with the present invention, it is provided that a computer-readable storage medium be used, in which a program is stored that allows a data-processing device to execute a method for interface adaptation of a hardware baseband receiver in satellite communication systems, after the program has been loaded into the memory of the data-processing device; with an interface adapter being inserted between a RF front end and the correlators of the hardware baseband receiver, and the interface adapter adjusting the
  sampling rate,
  intermediate frequency,
  quantization, and/or
  signal representation
of a baseband-receiver interface of the RF front end to specifiable values.

A further advantage of the present invention is that the development cycles of the RF front end and baseband receiver, which are manufactured with the aid of different technologies, may be decoupled. In addition, in each instance, an appropriate front end available on the market may be used for different requirements in view of criteria, such as price, sensitivity, frequency plan, qualification, or the like, without this requiring a change of the baseband and, therefore, a change of position-finding software as well. Particularly for "Host Based Solutions," in which a GNSS baseband is integrated in an ASIC having further functionality and a processor, one is able to profit from the further technological developments in the RF front ends during the lifetime of the ASIC product, without requiring a costly redesign. Dependence on suppliers of RF front ends is avoided by the present invention.

In the following, the invention is described in greater detail with regard to the design and the operating mode of an exemplary embodiment of an interface adapter 100 for hardware baseband receivers.

In order to achieve the required flexibility, a configurable interface adapter 100 is connected in incoming circuit to correlators 101 (cf. FIG. 1). In addition, the sampling frequencies and the intermediate frequencies of RF front end 102 are rendered configurable by configuration registers 103 provided for this purpose. This allows a baseband receiver 104 to be adjusted to a suitable RF front end 102 by simple reconfiguration with the aid of software.

The exemplary method described more precisely in the following is designed for RF front ends 102, where the output data are linearly quantized. In addition, one of the output bits is interpreted as a sign on with an algebraic sign bit in the exemplary design approach, which, however, does not generally represent a limitation.

Configurable interface adapter 100 fOr hardware baseband receivers is made up of a normalization unit 105 and a configurable baseband mixer 106. Normalization unit 105 brings a front signal into a uniform representation, in this case, e.g. "sign+amplitude." However, in other design approaches, it may also be another representation suitable for the baseband, such as one-complement or two-complement. In baseband mixer 106, the signal is mixed into the baseband in complex form.

1. Configuration Register 103

In the exemplary embodiment, the following configuration registers 103 are provided for the settings:

SAMPLE_RATE: sampling rate of the front-end data
IF_FREQ: intermediate frequency of RF front end 102
NEG_IF: set for mirrored IF signals
IF_MASK: configuration of the word length of the front-end data
COMPLEX_IF: set when the front-end signal is present in complex form in the I/Q representation; 0 in the case of real signals
ONE_COML: set in the case of signals in the one-complement representation
TWO_COML: set in the case of signals in the two-complement representation
MID_ZERO: set when, in the analog-to-digital converter, 0 represents a value instead of a threshold.

When the SAMPLE_RATE register is set, the time base for the processing in the GNSS receiver is produced. The clock pulses of the sampling in RF front-end 102 are counted. When the counter reaches the count of SAMPLE_RATE, the counter is reset and a time signal is generated by which the interrupt generation is controlled. When the value in the SAMPLE_RATE register is, for example, 1/10 of the sampling rate, then ten interrupts are generated per second. With the aid of the interrupt, processor 107 may fetch out the correlation data and start the position calculation. In this context, the storage device for correlation data is advantageously designed as an alternating buffer, which means that in the case of each interrupt, the memory page read out by processor 107 and the memory page on which correlators 101 work alternate.

IF_FREQ corresponds to the frequency value in the NCO (numerically controlled oscillator), with the aid of which a signal for mixing the data of RF front end 102 into the baseband is generated. The NCO is made up of an accumulator register, on which value IF_FREQ, as a fundamental frequency, and a value for the deviation from the fundamental frequency are added up. In this context, the range of values of the accumulator register corresponds to a period of the generated carrier signal.

Data from (GNSS) RF front end 102 have different quantizations (generally 1 to 4 bit). Configurable IF_MASK register indicates how many data bits from the interface to RF front end 102 are used. It is simultaneously used for scaling the correlated signal: in the case of the uniform signal path for different quantizations, the necessity of an increase in word length may be prevented in the case of higher quantizations, without risking an overflow into the registers after the correlation.

The data of RF front end 102 may be present in real or complex representation (I and Q). Real and I-parts of complex signals are processed in a first signal path 108. In set configuration register COMPLEX_IF, the bits belonging to the Q-portion of a complex signal are directed to second signal path 109.

Configuration NEG_IF symbolizes the use of reflected signals. This is mainly of interest in "aided loops," when on, for example, the carrier loop supports the code loop in the tracking. When using image frequencies in the output data of RF front end 102, different algebraic signs may be produced for the frequency offset in the code and carrier loops. In the case of a set NEG_IF, this effect may be taken into consideration in "aided loops" by the sign reversal of the frequency offset.

The bits ONE_COMPL and TWO_COMPL are used for configuring the data words. There are three representation options (cf. FIG. 2), which are valid for a real representation and each of the two branches of the complex representation: sign (1 bit) and amplitude (remaining bits), one complement and two complement.

The position of the quantization thresholds with respect to the 0 level is configured by the MID_ZERO register (cf. FIG. 3).

2. Normalization Unit 105

Sign bit $data_s$ of the data word is processed separately and is directly incorporated into design/amplitude representation $(d_a, d_s)$ as $d_s$. Amplitude $d_a$ is formed from the remaining bits ($data_n \ldots data_1$), using combinatorics. In this case, for the sake of clarity, the normalization is written down as a formula:

$$d_s = data_s$$

$$d_a = \sum_{k=1\ldots n} \frac{(2^n * (((t \text{ or } u) * data_s) \text{xor } data_k) * mask_k) *}{2^{(1-m)} + (1-m) + (m * t * data_s)}$$

In the formula, $m \in \{0;1\}$ for configuration MID_ZERO. $mask_k \in \{0;1\}$ represents the configuration of IF_MASK. In the case of a data-word length of w bit, the mask for the lower (w−1) bits is set to 1 for an extracted sign bit ($mask_{1\ldots w-1}=1$), otherwise to 0 ($mask_{w\ldots n}=0$). $t \in \{0;1\}$ and $u \in \{0;1\}$ stand for the configuration of TWO_COMPL and ONE_COMPL, respectively. The corresponding inputs and outputs of normalization unit 105 for data word and configuration data are shown in FIG. 4.

The formula may be easily implemented in hardware. Exemplary normalization unit 105 is set up in duplicate:
a module 110 for normalizing real signals or for normalizing the I-branch of complex signals, and
a module 111 for normalizing the Q-branch of complex signals.

1. Baseband Mixer 106

The normalized signal may now be mixed into the baseband by a complex baseband mixer 106. In this context, the signal reflection is taken into account by register NEG_IF. Configurable frequency value (IF_FREQ) and sampling rate (SAMPLE_RATE) allow both NCO (numerically controlled oscillator) and the time measurement to be adapted to the corresponding requirements of RF front end 102 and provide flexibility in the selection of RF front end 102, even according to these criteria.

The specific embodiment of the present invention is not limited to the preferred exemplary embodiments indicated above. On the contrary, a number of variants are conceivable which utilize the set-up of the present invention and the method of the present invention, even in the case of fundamentally different types of embodiments.

What is claimed is:

1. A method for interface adaptation of a hardware baseband receiver in satellite communications systems, comprising:
    adjusting, by an interface adapter that is inserted between a RF front end and correlators of a hardware baseband receiver, a signal representation of, and at least one of a sampling rate, intermediate frequency, and quantization of, a baseband-receiver interface of the RF front end to specifiable values;
    wherein at least the following registers are provided for the adaptation:
        SAMPLE_RATE, corresponding to a sampling rate of front-end data;
        IF_FREQ, corresponding to intermediate frequency of the front end;
        NEG_IF, set for reflected IF signals;
        IF_MASK, corresponding to configuration of the word length of the front-end data;
        COMPLEX_IF, set when the front-end signal is present in complex form in the I/Q representation, 0 in the case of real signals;
        ONE_COML, set in the case of signals in the one-complement representation;
        TWO_COML, set in the case of signals in the two-complement representation; and
        MID_ZERO, set when, in the analog-to-digital converter, 0 represents a value instead of a threshold.

2. The method according to claim 1, wherein the interface adapter converts the output signals of the RF front end into uniform representation and mixes the converted output signals onto a standard frequency.

3. A method for interface adaptation of a hardware baseband receiver in satellite communications systems, comprising:
    integrating into a microchip a hardware interface adapter;
    forming, in the interface adapter, components configured for communication by the interface adapter with each of a RF front end and correlators of a hardware baseband receiver; and inserting the interface adapter between the RF front end and the correlators, the interface adapter adjusting at least one of a sampling rate, intermediate frequency, quantization, and signal representation of a baseband-receiver interface of the RF front end to specifiable values;

wherein at least the following registers are provided for the adaptation:

SAMPLE_RATE, corresponding to a sampling rate of front-end data;

IF_FREQ, corresponding to intermediate frequency of the front end;

NEG_IF, set for reflected IF signals;

IF_MASK, corresponding to configuration of the word length of the front-end data;

COMPLEX_IF, set when the front-end signal is present in complex form in the I/Q representation, 0 in the case of real signals;

ONE_COML, set in the case of signals in the one-complement representation;

TWO_COML, set in the case of signals in the two-complement representation; and

MID_ZERO, set when, in the analog-to-digital converter, 0 represents a value instead of a threshold.

4. The method according to claim 2, wherein the conversion into the uniform representation is implemented by converting an output signal of the RF front end to a "sign+amplitude" representation and generating the one complement or the two complement of the output signal.

5. The method according to claim 2, wherein:

the uniform representation ($d_a$, $d_s$) of the signal is generated according to the following rule:

$$d_s = data_s,$$

$$d_a = \sum_{k=1\ldots n} \frac{(2^n * (((t \text{ or } u) * data_s) \text{xor } data_k) * mask_k) *}{2^{(1-m)} + (1-m) + (m * t * data_s)}$$

($data_n, \ldots data_1$, $data_s$) represents the output signal of the RF front end;

$d_s$ represents the sign bit of the signal converted into the uniform representation;

$d_a$ represents the amplitude of the signal converted into the uniform representation;

$m \in \{0;1\}$ indicates if, in the analog-to-digital converter, 0 represents a value (m=1) or a threshold (m=0);

$m_s \in \{0;1\}$ indicates the word-length configuration of the output signal of the RF front end, where in the case of a data-word length of w bit, the mask for the lower (w−1) bits is set to 1 ($mask_{1\ldots w-1}=1$) for an extracted sign bit, and otherwise to 0 ($mask_{w\ldots n}=0$);

$t \in \{0;1\}$ indicates if the output signals of the RF front end are present in the two-complement representation (t=1); and $u \in \{0;1\}$ indicates if the output signals of the RF front end are present in the one-complement representation (u=1).

6. The method according to claim 2, wherein the normalized output signals are mixed onto a standard frequency.

7. The method according to claim 3, wherein the RF front end supplies linearly quantized output data.

8. The method according to claim 3, wherein an interrupt generation is controlled by the register SAMPLE_RATE, and in the case of an interrupt, the storage device for correlation data is read out and the position calculation is started.

9. The method according to claim 8, wherein the storage device for correlation data takes the form of an alternating buffer, and in the case of each interrupt, the memory side read out by the processor and the memory side on which correlators operate alternate.

10. An interface adapter for hardware baseband receivers in satellite communication systems, comprising:

an interface to a RF front end;

an interface to correlators of a hardware baseband receiver; and an arrangement for adjusting at least one of a sampling rate, intermediate frequency, quantization, and signal representation of a baseband-receiver interface of the RF front end to specifiable values;

wherein at least the following registers are provided for the adaptation:

SAMPLE_RATE, corresponding to a sampling rate of front-end data;

IF_FREQ, corresponding to intermediate frequency of the front end;

NEG_IF, set for reflected IF signals;

IF_MASK, corresponding to configuration of the word length of the front-end data;

COMPLEX_IF, set when the front-end signal is present in complex form in the I/Q representation, 0 in the case of real signals;

ONE_COML, set in the case of signals in the one-complement representation;

TWO_COML, set in the case of signals in the two-complement representation; and

MID_ZERO, set when, in the analog-to-digital converter, 0 represents a value instead of a threshold.

11. The interface adapter according to claim 10, wherein the interface adapter includes at least one normalization unit and one configurable frequency mixer.

12. The interface adapter according to claim 11, wherein the normalization unit includes a module for normalizing real signals or for normalizing the I-branch of complex signals, and a module for normalizing the Q-branch of complex signals.

13. The interface adapter according to claim 10, wherein the interface adapter is integrated into a microchip.

14. A computer-readable storage medium, on which a program is stored that allows a data-processing device to execute a method using an interface adapter for interface adaptation of a hardware baseband receiver in satellite communication systems, after the program has been loaded into memory of the data-processing device, the interface adapter being inserted between a RF front end and correlators of the hardware baseband receiver, the method comprising:

the interface adapter adjusting at least one of a sampling rate, intermediate frequency, quantization, and signal representation of a baseband-receiver interface of the RF front end to specifiable values;

wherein at least the following registers are provided for the adaptation:

SAMPLE_RATE, corresponding to a sampling rate of front-end data;

IF_FREQ, corresponding to intermediate frequency of the front end;

NEG_IF, set for reflected IF signals;

IF_MASK, corresponding to configuration of the word length of the front-end data;

COMPLEX_IF, set when the front-end signal is present in complex form in the I/Q representation, 0 in the case of real signals;

ONE_COML, set in the case of signals in the one-complement representation;
TWO_COML, set in the case of signals in the two-complement representation; and
MID_ZERO, set when, in the analog-to-digital converter, 0 represents a value instead of a threshold.

15. A method comprising downloading a computer program from an electronic data network to a data-processing device that is connected to the data network, wherein the computer program allows the data-processing device to execute a method using an interface adapter for interface adaptation of a hardware baseband receiver in satellite communication systems, after the program has been loaded into memory of the data-processing device, the interface adapter being inserted between a RF front end and correlators of the hardware baseband receiver, the method for interface adaptation comprising:
the interface adapter adjusting at least one of a sampling rate, intermediate frequency, quantization, and signal representation of a baseband-receiver interface of the RF front end to specifiable values;
wherein at least the following registers are provided for the adaptation:
SAMPLE_RATE, corresponding to a sampling rate of front-end data;
IF_FREQ, corresponding to intermediate frequency of the front end;
NEG_IF, set for reflected IF signals;
IF_MASK, corresponding to configuration of the word length of the front-end data;
COMPLEX_IF, set when the front-end signal is present in complex form in the I/Q representation, 0 in the case of real signals;
ONE_COML, set in the case of signals in the one-complement representation;
TWO_COML, set in the case of signals in the two-complement representation; and
MID_ZERO, set when, in the analog-to-digital converter, 0 represents a value instead of a threshold.

16. A method for interface adaptation of a hardware baseband receiver in satellite communications systems, comprising:
an interface adapter, inserted between a RF front end and correlators of a hardware baseband receiver, adjusting at least one of a sampling rate, intermediate frequency, quantization, and signal representation of a baseband-receiver interface of the RF front end to specifiable values;
wherein at least the following registers are provided for the adaptation:
SAMPLE_RATE, corresponding to a sampling rate of front-end data;
IF_FREQ, corresponding to intermediate frequency of the front end;
NEG_IF, set for reflected IF signals;
IF_MASK, corresponding to configuration of the word length of the front-end data;
COMPLEX_IF, set when the front-end signal is present in complex form in the I/Q representation, 0 in the case of real signals;
ONE_COML, set in the case of signals in the one-complement representation;
TWO_COML, set in the case of signals in the two-complement representation; and
MID_ZERO, set when, in the analog-to-digital converter, 0 represents a value instead of a threshold.

17. An interface adapter for interface adaptation of a hardware baseband receiver in satellite communication systems, the interface adapter being inserted between a RF front end and correlators of the hardware baseband receiver, the interface adapter comprising:
an arrangement for adjusting a signal representation of, and at least one of a sampling rate, an intermediate frequency, and a quantization of, a baseband-receiver interface of the RF front end to specifiable values;
wherein at least the following registers are provided for the adaptation:
SAMPLE_RATE, corresponding to a sampling rate of front-end data;
IF_FREQ, corresponding to intermediate frequency of the front end;
NEG_IF, set for reflected IF signals;
IF_MASK, corresponding to configuration of the word length of the front-end data;
COMPLEX_IF, set when the front-end signal is present in complex form in the I/Q representation, 0 in the case of real signals;
ONE_COML, set in the case of signals in the one-complement representation;
TWO_COML, set in the case of signals in the two-complement representation; and
MID_ZERO, set when, in the analog-to-digital converter, 0 represents a value instead of a threshold.

18. A computer-readable storage medium, on which a program is stored that allows a data-processing device to execute a method using an interface adapter for interface adaptation of a hardware baseband receiver in satellite communication systems, after the program has been loaded into memory of the data-processing device, the interface adapter being inserted between a RF front end and correlators of the hardware baseband receiver, the method comprising:
the interface adapter adjusting a signal representation of, and at least one of a sampling rate, an intermediate frequency, and a quantization of, a baseband-receiver interface of the RF front end to specifiable values;
wherein at least the following registers are provided for the adaptation:
SAMPLE_RATE, corresponding to a sampling rate of front-end data;
IF_FREQ, corresponding to intermediate frequency of the front end;
NEG_IF, set for reflected IF signals;
IF_MASK, corresponding to configuration of the word length of the front-end data;
COMPLEX_IF, set when the front-end signal is present in complex form in the I/Q representation, 0 in the case of real signals;
ONE_COML, set in the case of signals in the one-complement representation;
TWO_COML, set in the case of signals in the two-complement representation; and
MID_ZERO, set when, in the analog-to-digital converter, 0 represents a value instead of a threshold.

* * * * *